(No Model.)
J. W. HOWELL.
ELECTRIC CURRENT INDICATOR.
No. 356,042. Patented Jan. 11, 1887.
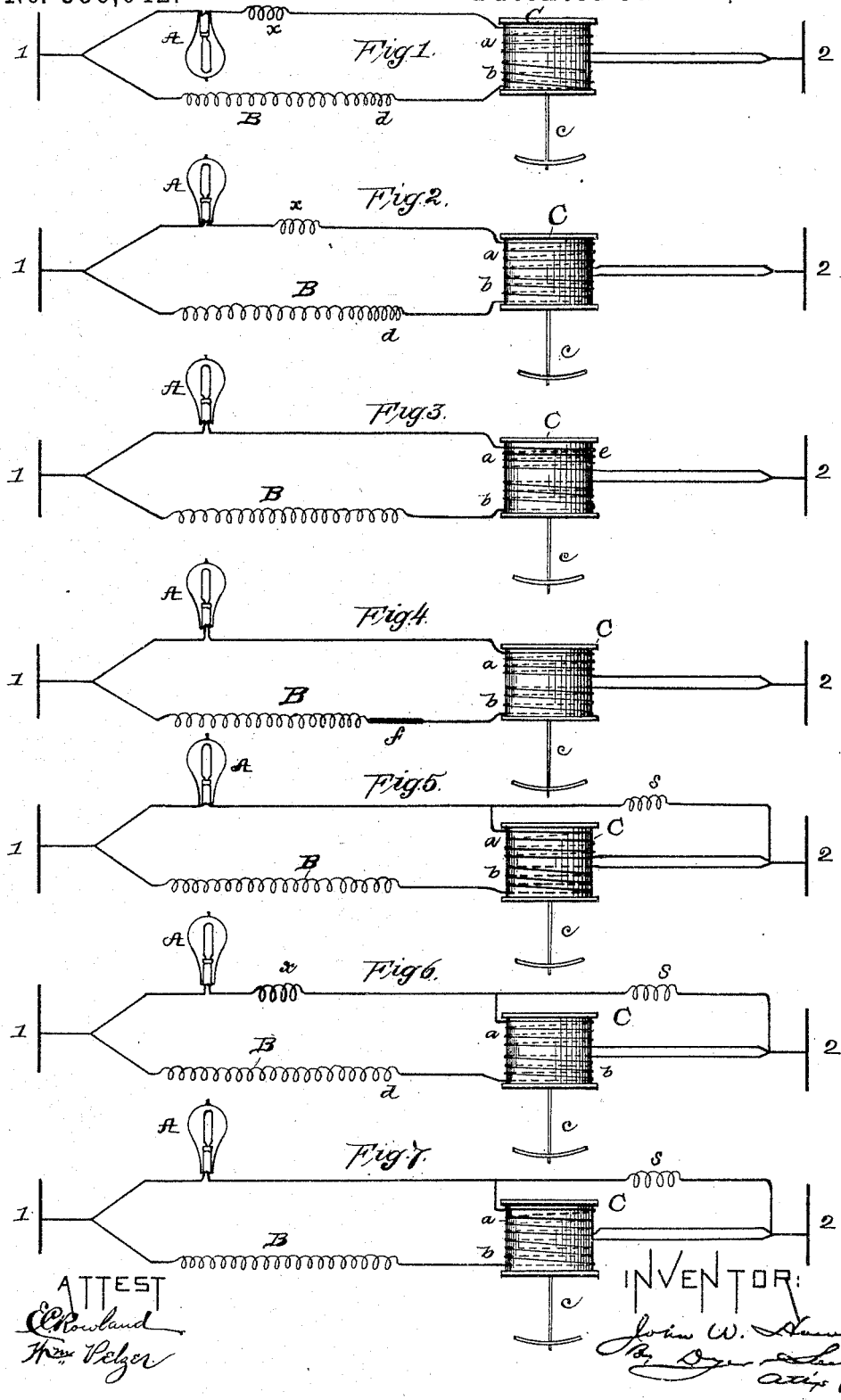

UNITED STATES PATENT OFFICE.

JOHN W. HOWELL, OF NEW BRUNSWICK, NEW JERSEY.

ELECTRIC-CURRENT INDICATOR.

SPECIFICATION forming part of Letters Patent No. 356,042, dated January 11, 1887.

Application filed June 5, 1886. Serial No. 204,234. (No model.)

*To all whom it may concern:*

Be it known that I, JOHN W. HOWELL, of New Brunswick, in the county of Middlesex and State of New Jersey, have invented a certain new and useful Improvement in Electrical Indicators, of which the following is a specification.

My invention relates to apparatus for measuring or indicating variations of electro-motive force, especially in electric lighting systems of that class in which a differentially-wound galvanometer is employed in the circuit of one of whose sets of coils is a resistance sensitive to changes in temperature, as an incandescent electric lamp, while in the circuit of the other set is a wire resistance, these two circuits being connected parallel to each other between the points of the circuit between which the electro-motive force or difference of potential is to be measured or indicated. In such an apparatus, if an increase occurs in the electro-motive force, the increased current causes an increased temperature in the lamp, and consequently a decreased resistance, while the wire resistance remains practically the same under the change. There will hence be more current in the lamp circuit than in the other, and its set of coils will exert a greater influence on the normally-balanced galvanometer-needle, so that such needle will be moved and the increase in electro-motive force will be indicated. A decrease in electro-motive force produces a contrary movement of the galvanometer-needle. In this apparatus difficulty and inaccuracy arise from the fact that the wire resistance, when the current passes continually through it, although the electro-motive force may remain constant, gradually and continually increases in temperature, and so also in resistance, until the normal equality of resistance between the two circuits is destroyed, the apparatus is thrown out of adjustment and the galvanometer unbalanced.

The object of my invention is to remedy this defect. I have devised several different means for accomplishing this, all of which, however, embody the same general principle—viz., the employment of a compensating resistance whose change in resistance under increased temperature is such as to counteract the effect on the galvanometer of the change in the regular wire resistance. It is in this that my invention mainly consists.

The figures of the accompanying drawings are diagrams, each illustrating one or more of the various ways of carrying into effect the principle which constitutes my invention. I will describe said figures in detail.

Like letters refer to corresponding parts in all these figures.

In each figure, 1 2 are the points between which the instrument is connected to indicate electro-motive force. A is the lamp-resistance, and B the equivalent wire resistance, they being in parallel circuits. The lamp-circuit includes coils $a$ of galvanometer C, and the wire-resistance circuit contains coils $b$ of such galvanometer, these two sets of coils being wound differentially, so that the galvanometer-needle $c$ normally stands at zero under their opposing influences. The coils B are preferably of German-silver wire.

The compensating arrangement in the form shown in Figure 1 consists in the addition of a small coil, $x$, of copper wire in the lamp-circuit. This is preferably one-ninth of the lamp-resistance or one-tenth of $B+x$. B must be also increased by the addition of a small length of German-silver wire, $d$, so that the total of B (that is, $B + d$) will be equal to lamp $+x$. Since copper changes in resistance more than German silver under equal changes in temperature, (usually about ten times as much, though different kinds of German silver vary in their coefficients of change of resistance,) the two circuits will be kept at their normal equality of resistance by this arrangement as the coils heat up.

Throughout the drawings copper wire is indicated by heavier lines than German silver.

Fig. 2 shows the same indicator compensated by the use of German-silver wire at $x$, the coil being of finer wire, or wound more compactly than coil B, so that it heats up more rapidly, and its increase of resistance will be the same as B. With the arrangement shown in Fig. 1 I prefer to wind $x$ and B on the same spool to keep their temperature the same. With the arrangement of Fig. 2 they must of course be on separate spools.

Fig. 3 shows a form in which the compensating resistance forms part of the galvanometer-coils. A portion, e, of the coils a is made of copper, all the rest of the coils being of German silver. The coils e increase in resistance at the same time as coils B, and the two circuits remain normally the same.

In the form shown in Fig. 4 I employ as a compensating resistance a piece of carbon, f, in series with B. Since the change in resistance of carbon under variation in temperature is opposite to the change in metal, the resistance of the circuit remains the same.

Figs. 5, 6, and 7 relate to a modified form of the indicator which has been employed, in which part of the galvanometer-coils are shunted around a resistance, s, in the lamp branch of the circuit, and the other part is in circuit with B, the last being made of much higher resistance than the lamp, so that the galvanometer-currents are equal. In this indicator there are two causes for inaccuracy. B increases in resistance and diminishes the current in its galvanometer-coil, and s increases its resistance and increases the current in the lamp-circuit galvanometer-coil. This latter effect may be compensated for in the manner shown in Fig. 5—viz., by making all the coils of the galvanometer of copper wire, which will heat and increase in resistance, so as to counteract the effect of increase in coil s; but if B, s, and galvanometer-coils are all of German silver the compensation may be performed by the same method as in Fig. 1—that is, as seen in Fig. 6, by a small copper coil, x, in the lamp-circuit. The proportional amount of this resistance x will depend upon the relative heating of s and galvanometer. If s normally heats more than galvanometer, x must be a little more than $\frac{1}{10}$ (B+x) or $\frac{11}{100}$ B; but if galvanometer heats more than s, x should be less than $\frac{11}{100}$ B, according to the relative temperatures.

If B and s are German silver and galvanometer is copper, as in Fig. 5, x will be greater or less than $\frac{11}{100}$ B, according as heat causes s to increase in resistance more or less proportionately than galvanometer. It is advisable to wind B, s, and x on one spool, so their relative temperatures will not be affected by outside influences.

It is evident that German silver can be used instead of copper at x by arranging it in the manner described with reference to Fig. 2.

Any metal which varies more than German silver may be used at x by using a metal for B that has a lower heat coefficient than German silver, as the alloy of platinum and silver.

The carbon resistance, as shown in Fig. 4, may also be used with the second form of indicator.

What I claim is—

1. In an electrical indicator, the combination of two parallel circuits, an incandescent electric lamp in one circuit, a wire resistance in the other, a galvanometer having two differential sets of coils, one in each circuit, and a resistance in one of said circuits compensating for the change in said wire resistance due to increased temperature, substantially as set forth.

2. In an electrical indicator, the combination of two parallel circuits, an incandescent electric lamp in one circuit, a wire resistance in the other, a galvanometer having two differential sets of coils, one in each circuit, and a coil in the lamp-circuit compensating for the change in resistance in said wire resistance due to increased temperature, substantially as set forth.

3. In an electrical indicator, the combination of two parallel circuits, an incandescent electric lamp in one circuit, a wire resistance in the other, and a galvanometer having two differential sets of coils, one in each circuit, the coils in the lamp-circuit being arranged to compensate for changes in resistance in said wire resistance due to increased temperature, substantially as set forth.

4. In an electrical indicator, the combination of two parallel circuits, an incandescent electric lamp in one circuit, a German-silver wire resistance in the other, a galvanometer having two differential sets of coils, one set in each circuit, and a copper coil in the lamp-circuit compensating for the change of resistance in said wire resistance due to increased temperature, substantially as set forth.

5. In an electrical indicator, the combination of two parallel circuits, an incandescent electric lamp in one circuit, a wire resistance in the other, a differential galvanometer having one set of coils in series with said wire resistance and the other in a shunt around a wire resistance in the lamp-circuit, and a resistance compensating for changes in resistance of said wire resistances due to increased temperature, substantially as set forth.

6. In an electrical indicator, the combination of two parallel circuits, an incandescent electric lamp in one circuit, a wire resistance in the other, a differential galvanometer having one set of coils in series with said wire resistance and the other in a shunt around a wire resistance in the lamp-circuit, and a coil in said lamp-circuit compensating for changes in resistance in said wire resistances due to increased temperature, substantially as set forth.

This specification signed and witnessed this 3d day of June, 1886.

JOHN W. HOWELL.

Witnesses:
WM. PELZER,
E. C. ROWLAND.